United States Patent
Schumann, III et al.

(10) Patent No.: US 11,831,775 B1
(45) Date of Patent: *Nov. 28, 2023

(54) USING SECURE TOKENS FOR STATELESS SOFTWARE DEFINED NETWORKING

(71) Applicant: Riverbed Technology, Inc., San Francisco, CA (US)

(72) Inventors: Robert Walter Schumann, III, Ashburn, VA (US); Donald Bradley Wood, Nashville, TN (US); Marlin Popeye McFate, Dumfries, VA (US); Michael Clayton Rudd, Katy, TX (US); Mircea I. T. Zetea, Feleacu (RO); Carlos Marcelo Rodriguez de Luna, Magnolia, TX (US)

(73) Assignee: Riverbed Technology, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/866,317

(22) Filed: Jul. 15, 2022

Related U.S. Application Data

(63) Continuation of application No. 16/999,783, filed on Aug. 21, 2020, now Pat. No. 11,477,026.

(60) Provisional application No. 62/990,968, filed on Mar. 17, 2020, provisional application No. 62/889,928, filed on Aug. 21, 2019.

(51) Int. Cl.
*H04L 9/32* (2006.01)
*H04L 29/06* (2006.01)

(52) U.S. Cl.
CPC .......... *H04L 9/3213* (2013.01); *H04L 9/3226* (2013.01); *H04L 9/3268* (2013.01)

(58) Field of Classification Search
CPC .... H04L 9/3213; H04L 9/3226; H04L 9/3268
See application file for complete search history.

(56) References Cited

U.S. PATENT DOCUMENTS

| | | | | |
|---|---|---|---|---|
| 9,491,620 B2* | 11/2016 | Edge | ...................... | H04L 63/107 |
| 10,149,156 B1* | 12/2018 | Tiku | ....................... | H04W 12/66 |
| 10,341,360 B2* | 7/2019 | Yao | ............................ | G06F 8/61 |
| 10,715,327 B1* | 7/2020 | Ramanujan | ......... | H04L 63/0838 |
| 10,938,855 B1* | 3/2021 | Waldie | .................. | G06F 21/575 |
| 11,477,026 B1* | 10/2022 | Schumann, III | .......... | H04L 9/40 |
| 2002/0191548 A1* | 12/2002 | Ylonen | ............... | H04L 63/0272 370/254 |
| 2006/0173848 A1* | 8/2006 | Peterson | ................. | H03M 7/30 707/999.009 |
| 2006/0294580 A1* | 12/2006 | Yeh | ........................ | H04L 63/20 726/3 |

(Continued)

*Primary Examiner* — Mohammad A Siddiqi
(74) *Attorney, Agent, or Firm* — Park, Vaughan, Fleming & Dowler LLP; Laxman Sahasrabuddhe

(57) ABSTRACT

Systems and techniques are described to facilitate using secure tokens for stateless software defined networking. An initial configuration may be created for deploying a network device at a deployment site. A cryptographically secure certificate may be created that includes the initial configuration for deploying the network device at the deployment site. The cryptographically secure certificate may be stored in a secure token that can be inserted into a secure token reader that is located at the deployment site and communicatively coupled to the device at the deployment site. The network device may then be configured at the deployment site by using the secure token.

20 Claims, 3 Drawing Sheets

(56) References Cited

U.S. PATENT DOCUMENTS

| | | | |
|---|---|---|---|
| 2013/0024700 A1* | 1/2013 | Peterson | G06F 16/1744 |
| | | | 713/189 |
| 2013/0275308 A1* | 10/2013 | Paraskeva | G06Q 20/3224 |
| | | | 705/44 |
| 2014/0108786 A1* | 4/2014 | Kreft | G06Q 20/3825 |
| | | | 713/194 |
| 2018/0183789 A1* | 6/2018 | Tischart | H04L 63/0876 |
| 2019/0220716 A1* | 7/2019 | Stillman | H04L 9/3226 |
| 2021/0150033 A1* | 5/2021 | Trivedi | G06F 21/577 |
| 2021/0297862 A1* | 9/2021 | Fukuda | H04W 12/40 |

* cited by examiner

US 11,831,775 B1

USING SECURE TOKENS FOR STATELESS SOFTWARE DEFINED NETWORKING

RELATED APPLICATION

This application is a continuation of U.S. patent application Ser. No. 16/999,783, filed on 21 Aug. 2020, the contents of which are herein incorporated by reference in their entirety for all purposes. U.S. application Ser. No. 16/999,783 claims benefit of U.S. Provisional Patent Application No. 62/889,928, filed on 21 Aug. 2019, the contents of which are herein incorporated by reference in their entirety for all purposes. U.S. application Ser. No. 16/999,783 claims benefit of U.S. Provisional Patent Application No. 62/990,968, filed on 17 Mar. 2020, the contents of which are herein incorporated by reference in their entirety for all purposes.

TECHNICAL FIELD

This disclosure generally relates to computer networking. More specifically, this disclosure relates to using secure tokens for stateless software defined networking (SDN).

BACKGROUND

In SDN, the control plane of the network is separated from the data plane. Individual network devices in the software defined network forward traffic based on the forwarding mechanism that is implemented in the network devices (i.e., the data plane comprises the interconnected set of network devices). However, the information about how to forward traffic (i.e., the control plane that includes forwarding tables and/or routing tables) is determined and distributed from controller nodes (e.g., an SDN controller, or just "controller" for short) in the network; these controller nodes implement the control plane. In other words, the control plane is operated independently from the network devices.

SDN can be viewed as an enhanced network management technique that is used for configuring and managing the control plane to enable fast, dynamic, and programmatically efficient network configuration, with the goal of improving network performance and monitoring. SDN technology fills the gap between, on the one hand, static and complex network deployments and, on the other hand, the needs of the end-users which include flexibility, monitoring, and user-friendly troubleshooting and configuration.

SUMMARY

Embodiments described herein provide techniques and systems for using secure tokens for stateless software defined networking. Some embodiments may create an initial configuration for deploying a network device at a deployment site. Next, the embodiments may create a cryptographically secure certificate that includes the initial configuration for deploying the network device at the deployment site. The embodiments may then store the cryptographically secure certificate in a secure token that can be inserted into a secure token reader that is located at the deployment site and communicatively coupled to the network device at the deployment site.

In some embodiments, the initial configuration may include a unique identifier (e.g., a globally unique serial number), an interface identifier of a network interface of the network device, an Internet Protocol (IP) address and an IP mask of the network device, an IP address of default gateway, IP address of a Domain Name System (DNS) server, and/or an IP address or a Uniform Resource Locator (URL) of a controller.

In some embodiments, the secure token may be inserted into a secure token reader that is located at the deployment site and communicatively coupled to the network device at the deployment site. In some embodiments, the secure token reader may be communicatively coupled to the network device by a wired communication cable. In some embodiments, the wired communication cable may be a Universal Serial Bus (USB) cable.

In some embodiments, the initial configuration may be extracted from the cryptographically secure certificate stored in the secure token. Specifically, extracting the initial configuration from the cryptographically secure certificate stored in the secure token may involve prompting a user to enter a pin code on a secure token reader.

In some embodiments, after the initial configuration has been extracted, the network device may be configured using the initial configuration, thereby enabling the network device to securely communicate with a controller. Specifically, the network device may authenticate itself with the controller, and then establish a secure communication channel with the controller.

In some embodiments, authenticating the network device with the controller may involve providing an IP address of the network device, a Global Position System (GPS) coordinate of the network device, and a Public Key Infrastructure (PKI) certificate to the controller.

Next, the network device may download a deployment configuration from the controller over the secure communication channel. The network device may then be configured using the deployment configuration, thereby enabling the network device to operate with a desired functionality at the deployment site.

DETAILED DESCRIPTION

Figure 1:
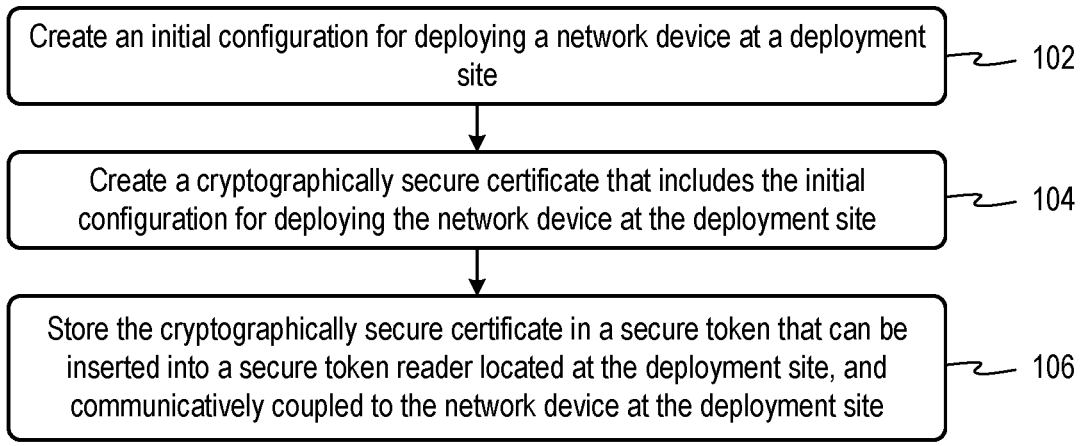
FIG. 1 illustrates a process for creating a secure token to facilitate configuration of a network device at a deployment site in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following embodiments: (1) only X; (2) only Y; (3) only Z; (4) X and Y; (5) X and Z; (6) Y and Z; and (7) X, Y, and Z.

According to one definition, a network device is any device that is capable of performing computations and communicating with other devices. In some embodiments, a network device can include a processing mechanism that is capable of executing instructions stored on a storage medium. Examples of network devices include, but are not limited to, appliances, routers, switches, smartphones, handheld computers, laptop computers, desktop computers, distributed computers, printers, etc.

According to one definition, a network includes multiple interconnected network devices, and is capable of delivering information from one network device (e.g., a server) to another network device (e.g., a client computer). Examples of networks include, but are not limited to, wireless and wired networks, local area networks (LANs), metropolitan area networks (MANs), wide area networks (WANs), private networks, public networks, intranets, internets, etc.

Communication between two network devices or nodes of a network is typically accomplished using a layered software architecture, which is often referred to as a networking software stack or simply a networking stack. As is generally true of any data processing function, a given functionality in a networking stack can be implemented using hardware or software or a combination thereof. The decision to implement a specific functionality in hardware or software is typically based on a tradeoff between performance and cost.

Each layer is usually associated with one or more protocols which define the rules and conventions for processing packets in that layer. Each lower layer performs a service for the layer immediately above it to help with processing packets, and each layer typically adds a header (control data) that allows peer layers to communicate with one another. At the sender, this process of adding layer specific headers is usually performed at each layer as the payload moves from higher layers to lower layers. The receiving host generally performs the reverse of this process by processing headers of each layer as the payload moves from the lowest layer to the highest layer.

A data link layer (or link layer for short) can be defined as a layer that manages a communication channel between adjacent network devices. For example, if two routers are connected to each other via a cable, then the link layer would typically manage the communication channel between these two routers. The Ethernet layer is an example of a link layer. A network layer can be defined as a layer that enables communication between any two network devices across the network. For example, the IP layer is an example of a network layer that enables communication between two routers in an IP network.

In traditional zero touch provisioning (ZTP), a network device can be powered up at a deployment site, and the network device can automatically configure itself by communicating with a controller. In a traditional ZTP scenario, it is typically assumed that a certain core set of services are available as a starting point that the network device can use to communicate with the controller. For example, in a typical ZTP scenario, the network device may assume that a Dynamic Host Configuration Protocol (DHCP) server is available at the deployment site. Once the network device obtains basic configuration information from the DHCP server (e.g., the IP address of the network device, the IP address of the default gateway, etc.), the network device can then establish a connection with a vendor controller (i.e., a controller that is maintained by the manufacturer of the network device). The network device may then provide identification information (e.g., a serial number of the network device) to the vendor controller. In response, the vendor controller may provide the address or identity of a customer's controller that owns the network device, and that has full control over the configuration of the network device. Next, the network device may communicate with the customer's controller to complete its configuration.

In many situations, the core services (e.g., DHCP) that traditional ZTP typically relies on do not exist at the deployment site. For example, when a network device is deployed in a hostile environment, the network device cannot assume that a core set of services would be available for configuring basic network parameters. The existing approach for handling such situations is to send a technician to the deployment site to manually configure the network device so that the network device is able to communicate with a controller. However, it may not be possible to send a technician to the deployment site, and even if it were possible, manual configuration can be costly, time consuming, and error prone. Additionally, if network devices need to be manually configured, it may be infeasible or impractical in existing approaches to frequently (e.g., on a daily basis) change or rotate the configuration, which may make it easier for a malicious entity to gather intelligence and/or compromise the network device. Also, in existing approaches, the configuration typically persists across reboots of the network device. Thus, if the deployment site is compromised, a user may need to physically destroy the network device (e.g., by burning the network device) to protect the configuration from falling into the hands of an adversary.

Embodiments described herein overcome the above-mentioned problems by implementing stateless ZTP of devices in situations where initial configuration services are not available to the device upon power up. Embodiments disclosed herein can completely bypass the initial steps that are typically performed in a typical ZTP process where the network device obtains basic configuration information, and then contacts the vendor controller to determine the identity of the customer's controller. Specifically, embodiments disclosed herein can enable a network device to securely obtain initial configuration information that is specific to the network device, and that does not require the network device to rely on any core services (e.g., DHCP) at the deployment site.

FIG. 1 illustrates a process for creating a secure token to facilitate configuration of a network device at a deployment site in accordance with some embodiments described herein.

The process may begin by creating an initial configuration for deploying a network device at a deployment site (step 102). In some embodiments, the initial configuration may include (1) an identifier associated with the network device (e.g., a device serial number that may be unique across a global namespace), (2) address (e.g., IP address or URL) of a controller that the network device may contact for obtaining a deployment configuration, (3) a DNS server that the network device may use to resolve URLs, (4) an interface identifier of a network interface of the network device that the network device is to use for communicating with the controller, (5) address information of the network device (e.g., an IP address and an IP mask of the network device), and (6) address information of a default gateway.

Next, the process may create a cryptographically secure certificate that includes the initial configuration for deploying the network device at the deployment site (step 104). In some embodiments, PKI may be used to generate the certificates. Note that the entire PKI may be owned and fully controlled by the customer (in this disclosure, the term "customer" generally refers to the user or entity that owns and/or controls the network device).

The process may then store the cryptographically secure certificate in a secure token that can be inserted into a secure token reader that is located at the deployment site and communicatively coupled to the network device at the deployment site (step 106). In some embodiments, the secure token may be a tamper resistance token that is compliant with Federal Information Processing Standard (FIPS) 140-2 level 3 and/or Common Criteria (CC) Evaluation Assurance Level 5+.

Figure 2:
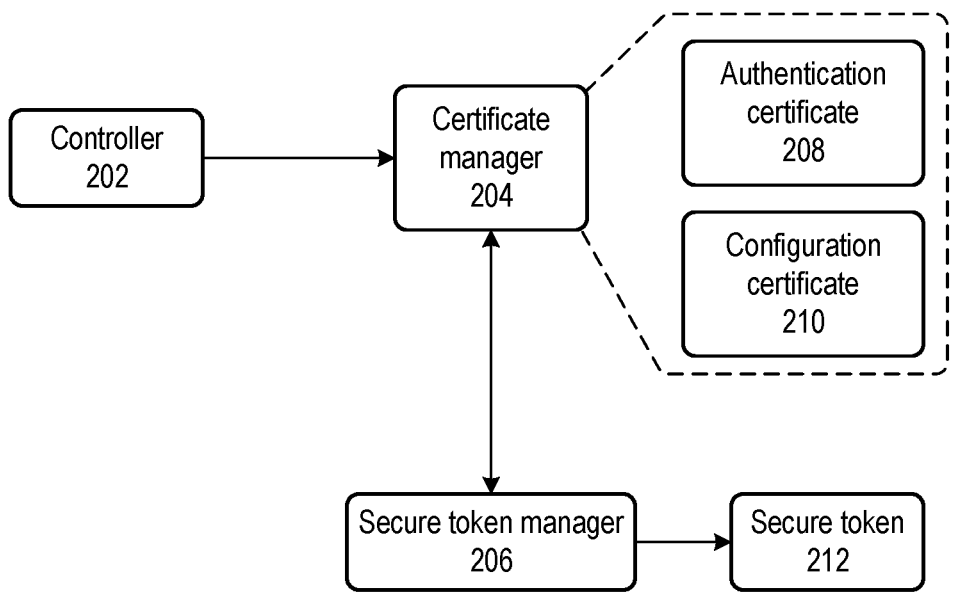
FIG. 2 illustrates a system for creating a secure token to facilitate configuration of a network device at a deployment site in accordance with some embodiments described herein.

FIG. 2 illustrates a system for creating a secure token to facilitate configuration of a network device at a deployment site in accordance with some embodiments described herein.

The system may include controller 202, certificate manager 204, and secure token manager 206. Controller 202 may be an SDN controller, and may be located at a site that may or may not be accessible from the deployment site. A user may instruct controller 202 to create an initial configuration for deploying the network device at the deployment site. Controller 202 may create the initial configuration, and provide the initial configuration to certificate manager 204. Certificate manager 204 may create a cryptographically secure certificate, e.g., configuration certificate 210, that includes the initial configuration. In some embodiments, configuration certificate 210 may also include cryptographic authentication information that may enable the network device (which is located at the deployment site) to authenticate itself with a controller and to establish a secure communication channel with the controller (the controller is typically not at the deployment site; the controller is typically at a remote site, but it may be reachable from the deployment site once the network device has been configured using the initial configuration). In some embodiments, certificate manager 204 may create an authentication certificate 208 (which is separate from configuration certificate 210) that the network device (which is at the deployment site) may use to authenticate itself with a controller and to establish a secure communication channel with the controller. Secure token manager 206 may request configuration certificate 210 (and optionally authentication certificate 208 in embodiments where the authentication certificate is separate from configuration certificate 210) from certificate manager 204. Upon receiving configuration certificate 210 (and optionally authentication certificate 208) from certificate manager 204, secure token manager 206 may store configuration certificate 210 (and optionally authentication certificate 208) on secure token 212. Secure token 212 may now be physically sent to the deployment site where secure token 212 may be used to configure the network device.

Figure 3:
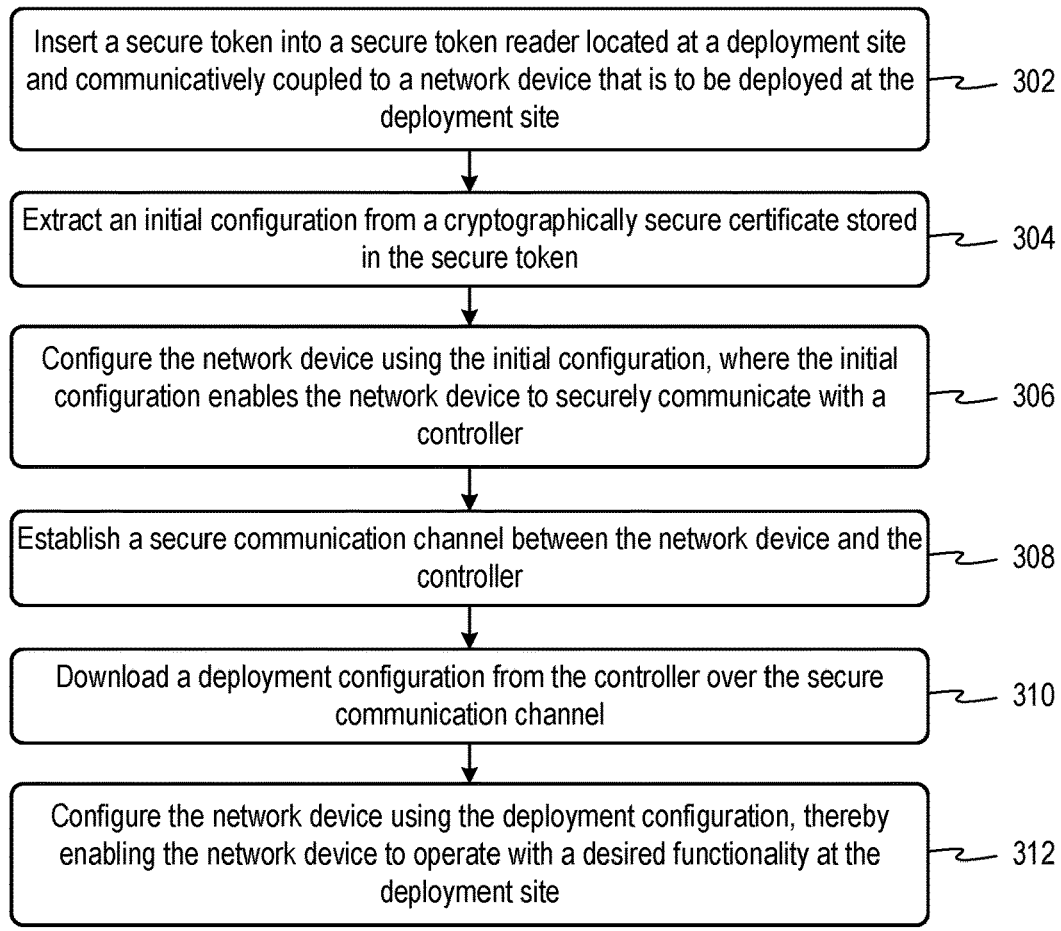
FIG. 3 illustrates a process for using a secure token to configure a network device at a deployment site in accordance with some embodiments described herein.

FIG. 3 illustrates a process for using a secure token to configure a network device at a deployment site in accordance with some embodiments described herein.

The process may begin by inserting a secure token into a secure token reader located at a deployment site and communicatively coupled to a network device that is to be deployed at the deployment site (step 302). Next, the process may extract an initial configuration from a cryptographically secure certificate stored in the secure token (step 304). In some embodiments, the secure token reader may require a pin code to be entered to access the secure token. In some embodiments, the secure token may include multiple enclaves, each enclave storing a separate initial configuration, and each enclave being associated with a separate pin code. Depending on the pin code that is entered in the secure token reader, the appropriate enclave may be accessed and the initial configuration present in the enclave may be extracted. Thus, the secure token reader may be used to select a particular identity from a set of different identities to configure the network device. The different identities may correspond to different behaviors and capabilities of the network device that are available to be deployed. In some embodiments, the secure token reader may auto lock after a user enters a predetermined number of incorrect pin codes.

The process may then configure the network device using the initial configuration, where the initial configuration enables the network device to securely communicate with a controller (step 306). Specifically, the initial configuration may specify the network interface to use and the address of the default gateway through which the controller may be reachable.

Next, the process may establish a secure communication channel between the network device and the controller (step 308). As part of establishing the secure communication channel, the network device may first authenticate itself with the controller. The authentication information provided by the network device may include, for example, its IP address, its Global Positioning System (GPS) location, and a PKI certificate. In embodiments where the configuration information and the authentication information are stored on separate cryptographically secure certificates, the authentication information may be obtained from the authentication certificate. In embodiments where the configuration and the authentication information is stored together on a single certificate, the authentication information may be obtained from the same certificate that stores the configuration information. Once the network device is successfully authenticated, the network device may establish a secure communication channel with the controller for communicating additional information with the controller.

Specifically, the network device may download a deployment configuration from the controller over the secure communication channel (step 310). The deployment configuration may be used to configure various services and protocols on the network device. In some embodiments, the deployment configuration may include network policy configuration that is to be used on the network device.

Next, the process may configure the network device using the deployment configuration, thereby enabling the network device to operate with a desired functionality at the deployment site (step 312).

Figure 4:
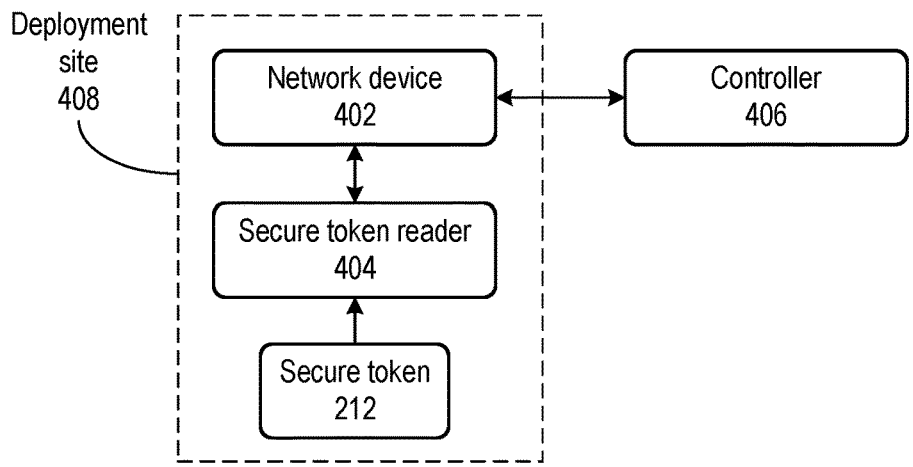
FIG. 4 illustrates how a secure token may be used to configure a network device at a deployment site in accordance with some embodiments described herein.

FIG. 4 illustrates how a secure token may be used to configure a network device at a deployment site in accordance with some embodiments described herein.

Secure token 212, which was created using the system shown in FIG. 2, may be inserted into secure token reader 404. Secure token reader 404 may be communicatively coupled (e.g., using a USB cable) to network device 402, which is desired to be deployed at deployment site 408. The contents of the secure token may be protected using multi-factor authentication, i.e., secure token reader 404 may require a user to present multiple authentication inputs (e.g., a pin code combined with a fingerprint scan) to unlock secure token 212.

Upon receiving a request from network device 402, secure token reader 404 may extract an initial configuration stored in secure token 212. Next, secure token reader may provide the initial configuration to network device 402. Network device 402 may use the initial configuration to configure various network parameters, which may enable network device 402 to securely communicate with controller 406 which may be same controller that helped create secure token 212, or may be a different controller. Specifically, network device 402 may use an authentication certificate that was stored in secure token 212 to authenticate itself with controller 406, establish a secure communication channel with controller 406, and download a deployment configuration from controller 406. Network device 402 may then use the deployment configuration to configure network parameters on network device 402, thereby enabling network device 402 to operate with a desired functionality at deployment site 408.

In some embodiments, the network device may not store any configuration information on a non-volatile storage medium (e.g., a disk). Thus, if power is lost on the network device or the network device is rebooted, the configuration may be lost. Upon powering on the device, the secure token may need to be used to configure the network device from scratch.

In some embodiments, the configuration of a network device may be changed or rotated periodically by creating new secure tokens that contain new configuration information. For example, a new card may be issued to a network device each day. Periodic rotation of the configuration information may ensure that any information gathering techniques or attacks that rely on fingerprinting metadata or that relay on detecting patterns in network device behavior would not work because frequently changing or rotating the configuration may prevent such metadata fingerprinting or pattern detecting techniques from identifying fingerprints or patterns in the network device's behavior.

In some embodiments, a first network device may be configured using a first secure token. The first network device may then establish a secure tunnel between the first network device and a remote network. Next, a second network device may be configured using a second secure token. The configuration stored in the second secure token may assume that the secure tunnel has already been established with the remote network. Thus, when the second network device is configured using the initial configuration information stored in the second secure token, the second network device may authenticate itself with a controller located in the remote network that is accessible through the secure tunnel, and download deployment configuration information from the controller over the secure tunnel.

Note that the secure token may be used as a one-time pad, i.e., the secure token may be used for a predetermined time period, and after expiry of the predetermined time period, the secure token may be physically destroyed or the certificate stored in the secure token may be revoked. The next time the device is used, a new secure token may be used that contains a potentially different configuration.

In some embodiments, the network device does not include a serial number that is typically used to identify the device, and lookup configuration for the device. In these embodiments, the identity of the device is solely obtained from the secure token.

In some applications, a network may be shared between multiple users or entities, where each user may configure the network from scratch by using one or more secure tokens that contain configuration information that is specific to that user. For example, at the beginning of a business day, a first company may use shared premises, and configure network devices in the shared premises by using a first set of secure tokens that are specific to the first company. At the end of the business day, the network devices may be powered down, which may erase or otherwise destroy any configuration that is stored in the network devices. On the next business day, a second company may use the shared premises and configure network devices using a second set of secure tokens. In this manner, the stateless software defined networking capabilities disclosed herein may facilitate using network devices on shared premises in a user friendly and secure fashion.

If a secure token is stolen or otherwise compromised, the certificate stored in the secure token may be revoked. An adversary or malicious entity that illegally obtains the secure token will not be able to configure the network device because the network device will not be able to successfully authenticate itself with the controller due to the revoked certificate. In this manner, the stateless software defined networking capability disclosed herein can prevent an adversary or malicious user from using the secure token to operate the network device as it would have operated under normal conditions.

Figure 5:
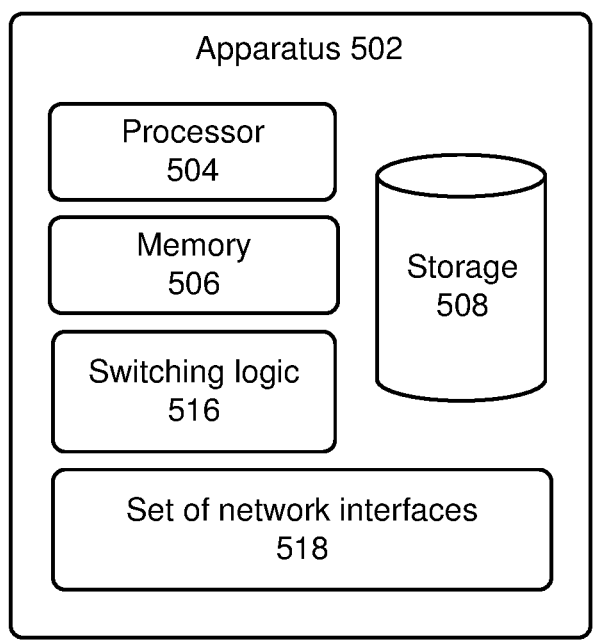
FIG. 5 illustrates an apparatus in accordance with some embodiments described herein.

FIG. 5 illustrates an apparatus in accordance with some embodiments described herein. Apparatus 502 (e.g., a network device, a controller, a secure token manager, etc.) can include processor 504, memory 506 (e.g., a volatile or non-volatile random access memory), and storage 508 (e.g., a flash memory device or a disk drive). Storage 508 can store data and executable code. The components in apparatus 502 can communicate with one another using a communication mechanism (not shown in FIG. 5), e.g., a bus, a backplane, and/or a switching fabric. Executable code stored in storage 508 can include instructions that, when executed by processor 504, cause apparatus 502 to perform one or more methods that are implicitly or explicitly described in this disclosure. Storage 508 can also store any data that is required by any processes that are performed by apparatus 502.

Apparatus 502 can also include switching logic 516 and set of network interfaces 518. Set of network interfaces 518 can be used to transmit data to and/or receive data from other communication devices. Switching logic 516 can forward network traffic received on one or more network interfaces in accordance with switching/forwarding/routing information stored in apparatus 502. Specifically, switching logic 516 can be configured by processor 504 in accordance with one or more methods that are implicitly or explicitly described in this disclosure.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A non-transitory computer-readable storage medium storing instructions which, when executed by a processor, cause the processor to:
    extract an initial configuration from a cryptographically secure certificate stored in a secure token;
    configure a network device using the initial configuration, wherein the initial configuration enables the network device to communicate with a controller; and
    establish a secure communication channel with the controller, wherein said establishing the secure communication channel comprises authenticating the network device with the controller, and wherein said authenticating the network device with the controller comprises providing an Internet Protocol (IP) address of the network device, a Global Position System (GPS) coordinate of the network device, and a Public Key Infrastructure (PKI) certificate to the controller.

2. The non-transitory computer-readable storage medium of claim 1, wherein the initial configuration comprises a unique identifier.

3. The non-transitory computer-readable storage medium of claim 1, wherein the initial configuration comprises an interface identifier of a network interface of the network device.

4. The non-transitory computer-readable storage medium of claim 1, wherein the initial configuration comprises the IP address of the network device.

5. The non-transitory computer-readable storage medium of claim 1, wherein the initial configuration comprises an IP address of a default gateway through which the controller is reachable.

6. The non-transitory computer-readable storage medium of claim 1, wherein the initial configuration comprises an IP address of a Domain Name System (DNS) server.

7. The non-transitory computer-readable storage medium of claim 1, wherein the initial configuration comprises an IP address or a Uniform Resource Locator (URL) of the controller.

8. The non-transitory computer-readable storage medium of claim 1, wherein the network device is located at a deployment site.

9. The non-transitory computer-readable storage medium of claim 8, wherein the secure token is in a secure token reader that is located at the deployment site and communicatively coupled to the network device.

10. The non-transitory computer-readable storage medium of claim 9, wherein the secure token reader is communicatively coupled to the network device using a wired communication cable.

11. The non-transitory computer-readable storage medium of claim 10, wherein the wired communication cable is a Universal Serial Bus (USB) cable.

12. The non-transitory computer-readable storage medium of claim 1, wherein said extracting the initial configuration for the network device from the cryptographically secure certificate stored in the secure token comprises prompting a user to enter a pin code.

13. The non-transitory computer-readable storage medium of claim 1, further storing instructions which, when executed by the processor, cause the processor to download a deployment configuration for the network device from the controller over the secure communication channel.

14. The non-transitory computer-readable storage medium of claim 13, further storing instructions which, when executed by the processor, cause the processor to configure the network device using the deployment configuration.

15. A method, comprising:
    extracting an initial configuration for a network device from a cryptographically secure certificate stored in a secure token;
    configuring the network device using the initial configuration, wherein the initial configuration enables the network device to communicate with a controller;
    authenticating the network device with the controller by providing, to the controller, an Internet Protocol (IP) address of the network device, a Global Position System (GPS) coordinate of the network device, and a Public Key Infrastructure (PKI) certificate; and
    establishing a secure communication channel between the network device and the controller in response to successfully authenticating the network device with the controller.

16. The method of claim 15, comprising inserting the secure token into a secure token reader that is communicatively coupled to the network device using a Universal Serial Bus (USB) cable.

17. The method of claim 15, wherein said extracting the initial configuration for the network device from the cryptographically secure certificate stored in the secure token comprises prompting a user to enter a pin code.

18. The method of claim 15, comprising downloading a deployment configuration for the network device from the controller over the secure communication channel.

19. The method of claim 18, comprising configuring the network device using the deployment configuration.

20. An apparatus, comprising:
    a secure token reader;
    a processor; and
    a memory storing instructions which, when executed by the processor, cause the processor to:
        extract an initial configuration from a cryptographically secure certificate stored in a secure token which is inserted in the secure token reader;
        configure the apparatus using the initial configuration, wherein the initial configuration enables the apparatus to communicate with the controller; and
        establish a secure communication channel with the controller, wherein said establishing the secure communication channel comprises authenticating the apparatus with the controller, and wherein said authenticating the apparatus with the controller comprises providing an Internet Protocol (IP) address of the apparatus, a Global Position System (GPS) coordinate of the apparatus, and a Public Key Infrastructure (PKI) certificate to the controller.

* * * * *